United States Patent [19]
Hite

[11] 3,794,386
[45] Feb. 26, 1974

[54] GRAIN FLOW CONTROLLER
[75] Inventor: Thomas W. Hite, Ligonier, Ind.
[73] Assignee: LML Engineering & Manufacturing Corp., Columbia City, Ind.
[22] Filed: Apr. 11, 1973
[21] Appl. No.: 349,982

[52] U.S. Cl................ 302/60, 222/564, 214/17 C, 239/590.5
[51] Int. Cl.......................................... B65g 53/42
[58] Field of Search...222/544, 547, 564, 566; 193/3; 241/39; 214/17 C; 302/60, 61, 63; 239/590.5, 592, 594, 601, 687

[56] References Cited
UNITED STATES PATENTS
3,390,918   7/1968   Reinke.................................. 302/60
3,618,798   11/1971  Dreier.............................. 302/60 X Primary Examiner—Stanley H. Tollberg
Assistant Examiner—Larry H. Martin
Attorney, Agent, or Firm—Woodard, Weikart, Emhardt & Naughton

[57] ABSTRACT

Disclosed is a flow controlling device or nozzle which is adapted for attachment to a discharge spout delivering a turbulent fluid flow, such as the grain flow from a grain transport auger. The device has a barrel portion with extending, staggered stave portions which smooth out the flow of grain and which prevent clogging of the device when large quantities of grain are introduced into it.

6 Claims, 5 Drawing Figures

PATENTED FEB 26 1974 3,794,386

3,794,386

GRAIN FLOW CONTROLLER

BACKGROUND OF THE INVENTION

In the filling of storage bins or other enclosures with fluid material it is desireable to introduce the fluid in a steady, unidirectional flow so that uneven filling of the storage area is minimized. In the filling of grain storage bins if the grain is not deposited evenly within the bin, considerable hand leveling, to top off the grain deposit, is necessary. The use of grain spreader, often power operated, to provide a uniform grain distribution pattern in filling a storage bin has become widespread. These devices, to some extent, remedy the problem. The flow controlling device of the present invention may be interposed between the transport auger discharge and a conventional grain spreader to smooth the flow of grain to the spreader and thus enhance its efficiency in uniformly distributing grain. Alternatively, the device of the present invention may be used to directly control the pulsating flow, with sideward or radial components, which is characteristic of auger delivery. Thus, the device may receive the auger discharge and deposit it directly into a storage or transport enclosure. The smooth, unidirectional flow of grain produced minimizes the necessity for hand leveling. The grain flow from the device is concentrated and uniform over the cross-sectional area of its outlet, and it is primarily useable in the filling of storage bins, either in conjunction with, or without, grain spreading devices, and in loading out trucks from a transport auger.

DESCRIPTION OF THE PREFERRED EMBODIMENT

Figure 1:
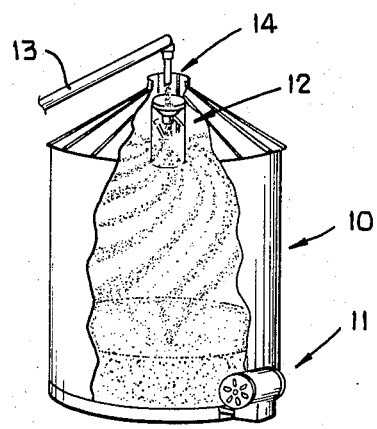
FIG. 1 is a perspective view, partially broken away, of the device of the present invention in use with a conventional grain spreader in filling a grain storage bin.
Figure 2:
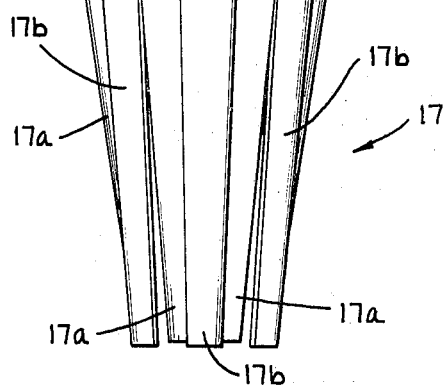
FIG. 2 is a side view of the device of the present invention.

Referring initially to FIG. 1, there is shown a conventional grain storage bin 10 having a means 11 for injecting dry heated air into the base of the storage bin to aerate and dry the grain. At the top of the bin, and disposed within it, is a conventional, powered grain spreader 12 which, in operation, distributes the grain in a circular pattern over the bin surface. The grain is moved to the top of the bin by means of an incoming spout 13 and attached to the discharge of the incoming spout is the control device of the present invention indicated generally at 14. The device receives grain from the spout 13 and discharges it centrally into the spreader 12. As previously mentioned, it will be understood that this is merely one application for the device of the present invention, and that the device 14 might be utilized without the spreader 12 by attaching a short piece of flexible tubing to the discharge of the incoming spout 13, so that the device can be lowered into position centrally within the bin fill opening.

The control device of the present invention is shown in detail in FIGS. 2, 3, 4 and 5. As there indicated, the device has a generally cylindrical barrel portion 16, the upper end 16a of which is adapted for attachment to a grain input conduit, such as the discharge end of a transport auger. The opposite end of the barrel portion has extending therefrom a series of elongated, staggered staves indicated generally at 17.

Figure 4:
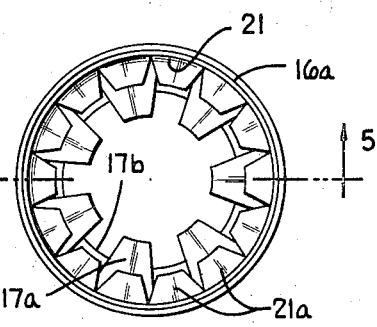
FIG. 4 is an end view of the device of the present invention taken from the inlet end.
Figure 5:
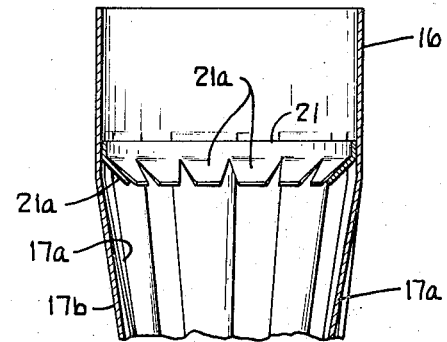
FIG. 5 is a partial, sectional view taken along the line 5—5 of FIG. 4.
Figure 3:
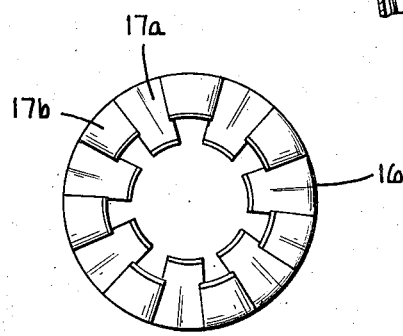
FIG. 3 is an end view of the device of the present invention taken from the outlet end.

The staves are generally tapered, that is, of narrowing width toward their free ends and, at their ends joined to the barrel portion 16, are of a width such that they overlap somewhat at their junction with the barrel, as may best be seen in FIG. 4. All of the staves are inclined inwardly somewhat toward the central, longitudinal axis of the device, however alternate staves, indicated at 17a, are inclined more sharply than the adjacent staves indicated at 17b. The arrangement is such that an imaginary line joining the tips of the staves 17b defines an opening of less area than the cross-sectional area enclosed by the barrel portion 16, and an imaginary line joining the tops of the staves 17a defines an opening of less area than the aforementioned line joining the tips of the staves 17b. Typical physical dimensions for the controlling device are a height of approximately 19 inches, and an inside diameter for the barrel portion 16 of approximately eight and one half inches. The diameter of the outer circle of staves (formed by the staves 17b) may be approximately six inches, and the diameter of the inner circle of staves (formed by the staves 17a) may be approximately four and one fourth inches.

The preferred form of the structure also incorporates a diversion ring taking the form of a metal band 21 (FIG. 5) which is secured to the inner surface of the barrel portion 16. Integral with, and depending from, the band are inwardly inclined tabs 16a, the tabs preferably having an inclination of approximately 45° with respect to the plane of the band. The diversion ring functions to initially direct axially inwardly the grain or other material moving through the barrel portion 16 and about to enter the stave area of the apparatus.

In operation, a fluid, such as grain or other particles having a turbulent flow is introduced into the upper end 16a of the barrel portion 16 of the device. The turbulent flow, such as might come from a grain transport auger, is pulsating and has a velocity, at a given point, which varies somewhat erratically in magnitude and direction, having substantial sideward or radial vectors. When grain is moving through the device, there is no substantial outward flexing of the staves, however, the space between the staggered staves permits grain to spill or move outwardly between the staves to accommodate relatively large quantities of grain passing through the device, and plugging of the device is thus avoided in situations which would tend to plug a solid, tapered discharge nozzle.

While the device of the present invention has been particularly described with reference to controlling the flow of grain or similar granular material, it will be understood that the device can be used to channel, direct and concentrate the flow of any type of fluid either in commercial or industrial applications.

I claim:

1. A flow controlling device utilized in filling grain-storing bins or the like and adapted to receive a turbulent fluid flow at its inlet end and to discharge a uniform non-turbulent flow of fluid at its outlet end, said device comprising a generally cylindrical barrel portion, one end of said barrel portion being adapted for attachment to a fluid input conduit, a series of elongated staves extending from the other end of said barrel portion, alternate ones of said staves being inclined inwardly toward the longitudinal axis of the barrel portion so that a line joining the tips of said inclined staves defines an opening of less area that a line joining the tips of the remaining staves.

2. A flow controlling device as claimed in claim 1 in which all of said staves are inclined inwardly with said alternate ones of said staves being inclined inwardly at a sharper angle than the remaining staves, so that a line joining the tips of said remaining staves defines an opening of less area than the cross-sectional area enclosed by said barrel portion.

3. A flow controlling device as claimed in claim 1 in which said staves are tapered toward their free ends, the wide ends of the staves overlapping somewhat at their juncture with said barrel portion.

4. A flow controlling device as claimed in claim 1 which includes flow diverting tabs extending inwardly toward the central longitudinal axis of said barrel portion and disposed adjacent the junction of said staves and said barrel portion.

5. A flow controlling device as claimed in claim 4 in which said flow diverting tabs extend inwardly and toward the tips of said staves at an angle of appropriately 45° with the interior surface of said barrel portion.

6. A flow controlling device as claimed in claim 2 in which the ratio of the diameter of said barrel portion to the diameter of said opening defined by the tips of said remaining staves is approximately 3 to 2, and the ratio of the diameter of said opening defined by the tips of said remaining staves to the diameter of the opening defined by said alternate stave tips is also approximately 3 to 2.

* * * * *